(12) United States Patent
Maliakal (10) Patent No.: US 8,440,299 B2
(45) Date of Patent: May 14, 2013

(54) COMPOSITE DIELECTRIC MATERIAL FOR HIGH-ENERGY-DENSITY CAPACITORS

(75) Inventor: Ashok J. Maliakal, Westfield, NJ (US)

(73) Assignee: LGS Innovations LLC, Florham Park, NJ (US)

( * ) Notice: Subject to any disclaimer, the term of this patent is extended or adjusted under 35 U.S.C. 154(b) by 486 days.

(21) Appl. No.: 12/712,373

(22) Filed: Feb. 25, 2010

(65) Prior Publication Data

US 2011/0205685 A1     Aug. 25, 2011

(51) Int. Cl.
*H01G 4/20* (2006.01)
*H01G 4/06* (2006.01)
*H01B 3/00* (2006.01)

(52) U.S. Cl.
USPC .............. 428/403; 361/312; 361/311

(58) Field of Classification Search .......... None
See application file for complete search history.

(56) References Cited

U.S. PATENT DOCUMENTS

| | | | |
|---|---|---|---|
| 4,670,355 A * | 6/1987 | Matsudaira | 428/690 |
| 6,004,681 A | 12/1999 | Epstein et al. | |
| 7,338,722 B2 * | 3/2008 | Thompson et al. | 428/690 |
| 7,369,396 B2 * | 5/2008 | Maliakal | 361/311 |
| 7,515,808 B2 | 4/2009 | Doerr et al. | |
| 7,928,433 B2 * | 4/2011 | Li | 257/40 |
| 2005/0095448 A1 | 5/2005 | Katz et al. | |
| 2007/0145453 A1 * | 6/2007 | Wu et al. | 257/310 |
| 2008/0017848 A1 | 1/2008 | Maliakal | |
| 2010/0027192 A1 * | 2/2010 | Perry et al. | 361/323 |

FOREIGN PATENT DOCUMENTS

WO     WO 2006124670 A2 *  11/2006

OTHER PUBLICATIONS

Qin Chen, et al., "High Field Tunneling as a Limiting Factor of Maximum Energy Density in Dielectric Energy Storage Capacitors," Applied Physics Letters vol. 92, 142909, 2008, http://apl.aip.org [Retrieved on Feb. 16, 2010] (3 pages).
Baojin Chu, et al., "A Dielectric Polymer with High Electric Energy Density and Fast Discharge Speed," Science, Jul. 2006, vol. 313, www.sciencemag.org [Retrieved on Dec. 16, 2008] (5 pages).
P. Kim, et al., "Phosphonic Acid-Modified Barium Titanate Polymer Nanocomposites with High Permittivity and Dielectric Strength," Advanced Materials, 2007, v. 19, pp. 1001-1005.

(Continued)

*Primary Examiner* — Alicia Chevalier
*Assistant Examiner* — Alexandre Ferre
(74) *Attorney, Agent, or Firm* — Mendelsohn, Drucker & Associates, P.C.

(57) ABSTRACT

A composite dielectric material having a plurality of particle cores, each surrounded by polymer strands that are chemically bonded to the surface of the particle core. Each polymer strand includes a linker, through which the polymer strand is attached to the surface, an interfacial core-shielding (ICS) group bound to the linker, and a polymer molecule bound to the ICS group. The ICS groups are designed to inhibit electrical breakdown of the composite dielectric material by (i) deflecting or scattering free electrons away from the particle cores and/or (ii) capturing free electrons by being transformed into relatively stable radical anions. Representative examples of the particle core material, linker, ICS group, and polymer molecule are titanium dioxide, a phosphonate group, a halogenated aromatic ring, and a polystyrene molecule, respectively.

26 Claims, 8 Drawing Sheets

OTHER PUBLICATIONS

M.A. White, et al., "'Click' Dielectrics: Use of 1,3-Dipolar Cycloadditions to Generate Diverse Core-Shell Nanoparticle Structures with Applications to Flexible Electronics," Macromol. Rapid Commun., 2008, v. 29, pp. 1544-1548.

N. Guo, et al., "Nanoparticle, Size, Shape, and Interfacial Effects on Leakage Current Density, Permittivity, and Breakdown Strength of Metal Oxide-Polyolefin Nanocomposites: Experiment and Theory," J. Am. Chem. Soc., 2007, v. 129, pp. 766-767.

A. Maliakal, et al., "Inorganic Oxide Core, Polymer Shell Nanocomposite as a High K Gate Dielectric for Flexible Electronics Applications," J. Am. Chem. Soc., 2005, v. 127, pp. 14655-14662.

P. Kim, et al., "Solution-Processible High-Permittivity Nanocomposite Gate Insulators for Organic Field-Effect Transistors," Applied Physics Letters, 2008, v. 93, pp. (013302-1)-(013302-3).

* cited by examiner

PEDOT    PSS n = 1, 2,...
m = 1, 2,...

COMPOSITE DIELECTRIC MATERIAL FOR HIGH-ENERGY-DENSITY CAPACITORS

BACKGROUND

1. Field of the Invention

The present invention relates generally to high-energy-density capacitors, materials for high-energy-density capacitors, and methods of making high-energy-density capacitors.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Dielectric materials play a key role in modern electronics and electric-power systems, e.g., due to their use in capacitors and batteries. An important characteristic of a dielectric material is its dielectric strength, defined as the maximum electric-field strength that the material can withstand without breaking down, e.g., through a catastrophic failure of its electrical insulating properties. For a representative dielectric material, the maximum energy density ($U_D$) that can be stored in the material is given by Eq. (1):

$$U_D = \frac{1}{2}\varepsilon_d \varepsilon_0 E_B^2 \qquad (1)$$

where $\varepsilon_d$ is the dielectric constant of the material; $\varepsilon_0$ is the dielectric permittivity of free space; and $E_B$ is the dielectric strength. It is beneficial to have access to high energy-storage densities, e.g., because the use of the corresponding dielectric materials in energy-storage devices enables a significant reduction in the volume, weight, and cost of those devices.

Eq. (1) indicates that both the dielectric constant and dielectric strength of the material are important for achieving high (e.g., greater than about 10 J/cm³) energy-storage densities. However, these energy-storage densities are not yet supported by the dielectric materials that are commercially available today. For example, metal oxides have relatively large dielectric constants but relatively low dielectric strengths. Organic materials (e.g., polymers) can have relatively high dielectric strengths, but are usually characterized by modest-to-low dielectric constants.

SUMMARY

Disclosed herein are various embodiments of a composite dielectric material having a plurality of particle cores, each surrounded by polymer strands that are chemically bonded to the surface of the particle core. In one embodiment, the particle cores have a relatively small size, e.g., between about 10 nm and 100 nm, and include a material having a relatively large dielectric constant, e.g., greater than about 10. Each polymer strand includes (a) a linker, through which the polymer strand is attached to the surface, (b) an interfacial core-shielding (ICS) group bound to the linker, and (c) a polymer molecule bound to the ICS group. The ICS groups are designed to inhibit electrical breakdown of the composite dielectric material by (i) deflecting or scattering free electrons, through repulsive Coulomb interactions, away from the particle cores and/or (ii) capturing free electrons by being transformed into relatively stable radical anions. Representative examples of the particle core material, linker, ICS group, and polymer molecule are titanium dioxide, a phosphonate group, a halogenated aromatic ring, and a polystyrene molecule, respectively. Advantageously, a typical composite dielectric material of the invention has a relatively high effective dielectric constant and high dielectric strength, which enables the material to withstand, without electrically breaking down, relatively high energy-storage densities, e.g., greater than about 10 J/cm³.

According to one embodiment, provided is an apparatus having an electrode and a layer of a composite dielectric material adjacent to the electrode. The composite dielectric material comprises a first plurality of particle cores and a plurality of polymer strands. A polymer strand of the plurality is chemically bonded to a corresponding particle core via a first linker and comprises an ICS group and a first polymer molecule. The ICS group is chemically bonded to the first linker and to the first polymer molecule.

According to another embodiment, provided is a composite dielectric material having a plurality of particle cores and a plurality of polymer strands. A polymer strand of the plurality is chemically bonded to a corresponding particle core via a first linker and comprises an ICS group and a first polymer molecule. The ICS group is chemically bonded to the first linker and to the first polymer molecule.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1:
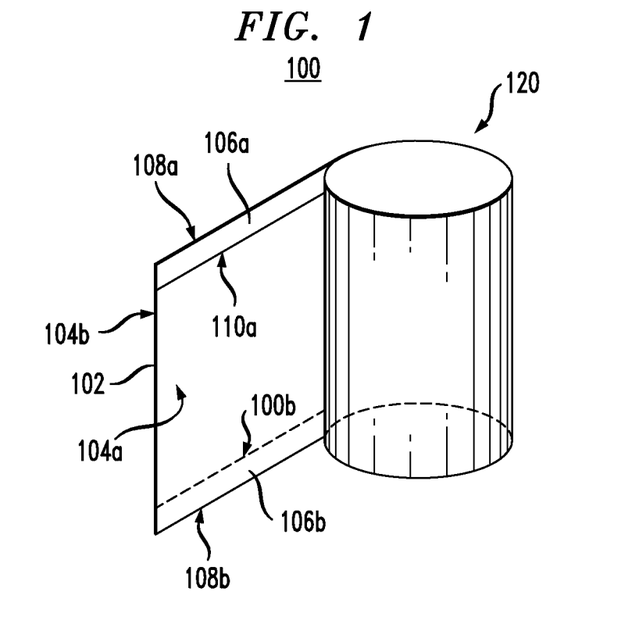
FIG. 1 illustrates a fabrication process for a capacitor according to one embodiment of the invention.

FIG. 1 illustrates a fabrication process for a rolled-film capacitor 100 according to one embodiment of the invention. Capacitor 100 has a thin film 102 made of a composite dielectric material. Representative composite dielectric materials that can be used to form film 102 are described in more detail below in reference to FIGS. 3-6. Dielectric film 102 is metallized so that metal films (electrodes) 104 are formed on its both sides, and then rolled up into a cylindrical shape 120 as shown in FIG. 1. Each of metal films 104 is deposited onto dielectric film 102 so that there is a margin 106 between a corresponding edge 108 of the dielectric film and a corresponding edge 110 of the metal film. For example, metal film 104a is deposited onto dielectric film 102 to form margin 106a near the top edge 108a of the dielectric film. Similarly, metal film 104b is deposited onto the opposite side of dielectric film 102 to form margin 106b near the bottom edge 108b of the dielectric film. Margins 106 enable rolled-film capacitor 100 to have electrical leads (not explicitly shown in FIG. 1) attached to the planar facets of cylindrical shape 120 so that one of the leads provides an electrical contact for metal film 104a while the other lead provides an electrical contact for metal film 104b.

Figure 2:
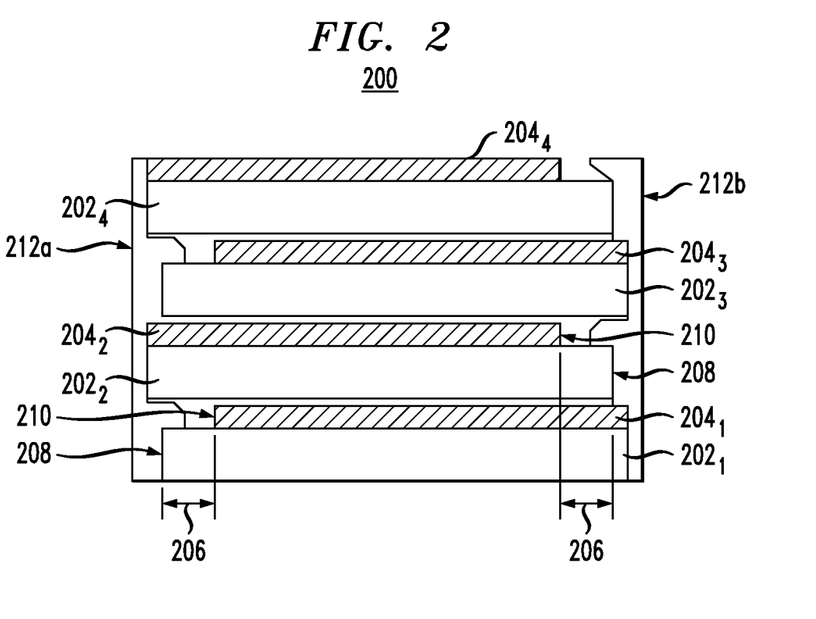
FIG. 2 shows a cross-sectional side view of a capacitor according to another embodiment of the invention.

FIG. 2 shows a cross-sectional side view of a stacked-film capacitor 200 according to another embodiment of the invention. Capacitor 200 has a plurality of thin films $202_i$ made of a composite dielectric material, which is described in more detail below in reference to FIGS. 3-6. Each dielectric film 202 has a corresponding metal film (electrode) 204 deposited onto its one side so that there is a margin 206 between a corresponding edge 208 of the dielectric film and a corresponding edge 210 of the metal film. Dielectric films $202_i$ are stacked so that even- and odd-indexed dielectric films have their respective margins 206 on opposite sides 212 of the stack. Sides 212 are metallized so that (i) the metallization of side 212a electrically connects metal films 204 corresponding to even-indexed dielectric films $202_i$ in parallel to one another and (ii) the metallization of side 212b electrically connects metal films 204 corresponding to odd-indexed dielectric films $202_i$ in parallel to one another. Capacitor 200 further has two electrical leads (not explicitly shown in FIG. 2) attached to sides 212a-b, respectively, to provide electrical contacts for the corresponding sets of electrically connected metal films 204.

Figure 3:
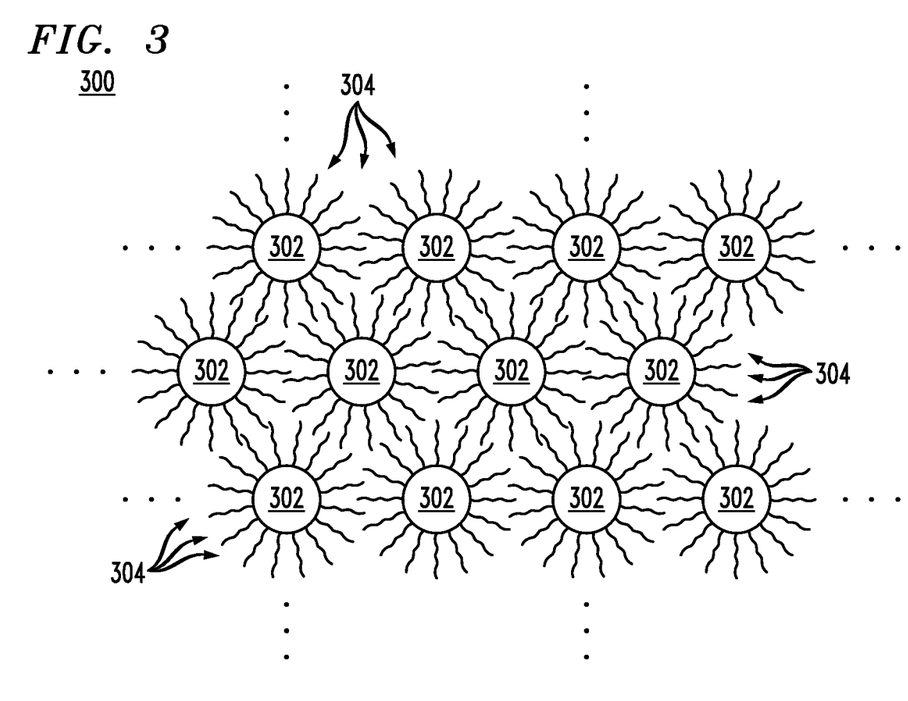
FIG. 3 schematically shows a composite dielectric material that can be used to form a dielectric film used in the capacitor of FIG. 1 or FIG. 2 according to one embodiment of the invention.

FIG. 3 schematically shows a composite dielectric material 300 that can be used to form dielectric films 102 and/or 202 according to one embodiment of the invention. More specifically, composite dielectric material 300 is a substantially homogeneous (e.g., pseudo-homogeneous) material having a substantially uniform distribution of particle cores 302, where each particle core is surrounded by a covering (or shell) having one or more polymer strands 304. At least some of strands 304 are chemically bonded to the corresponding particle core(s). In a representative embodiment, particle cores 302 occupy at least 5% of the total volume in composite dielectric material 300 and typically occupy 10-40% or more.

Particle cores 302 have a relatively small size, e.g., smaller than about 0.5 µm, and preferably a largest particle-core dimension between about 10 nm and 50 nm, and include a material having a relatively large dielectric constant, e.g., greater than about 10. Due to the relatively large dielectric constant of particle cores 302, composite dielectric material 300 has a higher effective dielectric constant than a corresponding polymeric material without such particle cores. As already indicated above, having a relatively high dielectric constant is beneficial for achieving high energy-storage density (see, e.g., Eq. (1)).

Particle cores 302 may have a variety of shapes, e.g., spherical, elongated, or irregular, and a variety of sizes. In a representative embodiment, composite dielectric material 300 has a particle concentration of between about $10^{14}$ and $10^{18}$ particles/cm$^3$. Representative materials that can be used to form particle cores 302 include but are not limited to: barium sodium niobate, barium oxide, barium titanate, barium titanium niobate, cadmium pyroniobate, potassium niobate, potassium strontium niobate, potassium tantalite, manganese oxide, lead magnesium niobate, lead sulfide, lead selenide, lead telluride, antimonous selenide, tin telluride, stronitum titanate, and titanium oxide.

In one embodiment, composite dielectric material 300 has particle cores 302 of two different types. For example, particle cores 302 of the first type are made of an inorganic material having a relatively large dielectric constant, e.g., greater than about 10 (also see the non-exclusive list in the preceding paragraph), while particle cores 302 of the second type are made of an inorganic material having a smaller dielectric constant, e.g., smaller than about 10. Representative materials that can be used to form particle cores 302 of the second type include but are not limited to: silicon oxide, aluminum oxide, aluminum nitride, montmorrillonite, and various silicate clays. In various embodiments, the relative ratio (by volume) between particle cores 302 of the two types can range, e.g., from about 99 (type 1):1 (type 2) to about 50 (type 1):50 (type 2). With appropriately selected particle cores 302 of the second type, the inclusion of even a small fraction of those particle cores into composite dielectric material 300 significantly increases the dielectric strength of the material.

While the polymer covering corresponding to a particular particle core 302 may or may not be fully continuous around that particle core, the polymer coverings of different particle cores taken together form a polymer matrix between the particle cores. This matrix substantially prevents particle cores 302 from aggregating and phase-separating, insulates different particle cores from one another, and fills the volume between the particle cores such that even a relatively thin (e.g., about 0.1 µm) layer of composite dielectric material 300 has a relatively smooth surface.

As already indicated above, some of polymer strands 304 may be chemically bonded (e.g., at one end) to the outer surface of the associated particle core 302. The chemical bonds may be moderate to strong covalent bonds, hydrogen bonds, or coordination bonds. Polymer strands 304 of one particle core might have a distribution of lengths or substantially the same length. In one embodiment, polymer strands 304 have a degree of polymerization between about 20 and 200 (alternatively, molecular weights between approximately 2000 and 20,000 amu). Polymer strands 304 of adjacent cores may partially inter-digitate and interact with each other rather strongly via attractive van der Waals forces, physical hooking, entanglement, and/or chemical cross linking. Such interactions between polymer strands 304 can advantageously stabilize the entire structural matrix of composite dielectric material 300 and provide robustness and integrity to the material.

Figure 4:
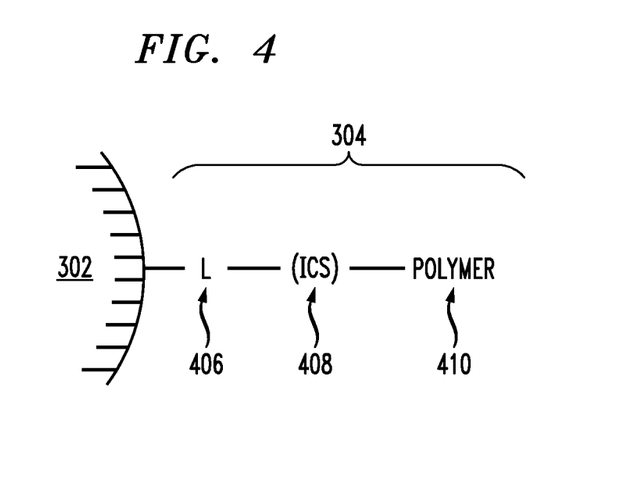
FIG. 4 schematically shows one polymer strand attached to the corresponding particle core in the composite dielectric material of FIG. 3 according to one embodiment of the invention.

FIG. 4 schematically shows one polymer strand 304 attached to the corresponding particle core 302 in composite dielectric material 300 according to one embodiment of the invention. More specifically, polymer strand 304 comprises an interfacial core-shielding (ICS) group 408 that (i) at one end, is bonded, through a linker (L) 406, to the surface of particle core 302 and (ii) at another end, is bonded to a polymer molecule 410. In various alternative embodiments, ICS group 408 might be bonded to the surface of particle core 302 through multiple linkers 406 and/or be linked to multiple polymer molecules 410.

Linker 406 is a chemical group that has at least one chemical bond with the surface atom(s) of particle core 302. In one embodiment, linker 406 can be produced from a chemical precursor having a phosphonate group. The phosphonate group is transformed into linker 406 through a reaction of surface atoms of particle core 302 with the oxygen of the phosphorus-oxygen double bond, and possibly also through interactions between surface atoms and the other oxygen atoms in the phosphonate. In another embodiment, linker 406 can be produced from a chemical precursor having a silyl group. The silyl group is transformed into linker 406 through a reaction of surface groups with the silicon atom of the precursor and displacement of halides or alkoxides from the precursor. In yet another embodiment, linker 406 can be produced from a chemical precursor having a carboxylic-acid group by removing the H atom from that group and using the freed valence to form a chemical bond with a surface atom of particle core 302. Additional details on various embodiments of linker 406, suitable chemical precursors for the linker, and chemical reactions for transforming the precursor into the linker can be found, e.g., in U.S. Pat. Nos. 7,369,396 and 7,515,808 and U.S. Patent Application Publication Nos. 2005/0095448 and 2008/0017848, all of which are incorporated herein by reference in their entirety.

Polymer molecule 410 generally comprises a linear and/or branched chain of monomers terminated by one or more end groups. In various embodiments, polymer molecule 410 can be a polyethylene, polypropylene, or polystyrene molecule or a related polyolefin molecule.

Figure 5:
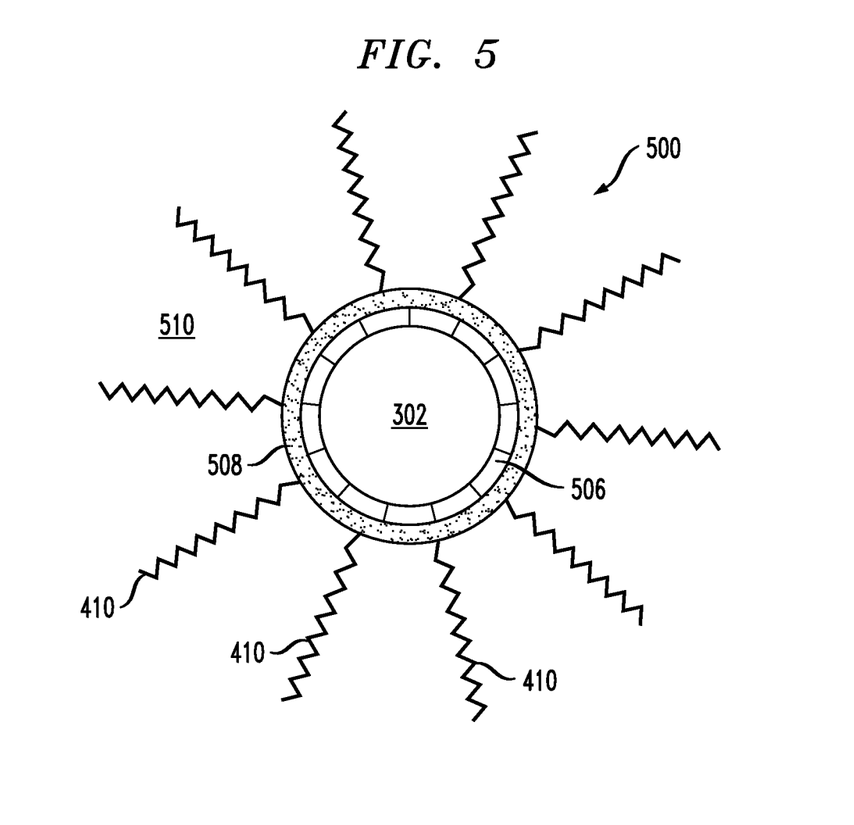
FIG. 5 shows a cross-sectional view of a shell structure formed by multiple polymer strands around the corresponding particle core in the composite dielectric material of FIG. 3 according to one embodiment of the invention.

FIG. 5 shows a cross-sectional view of a shell structure 500 formed by multiple polymer strands 304 around the corresponding particle core 302 in composite dielectric material 300 according to one embodiment of the invention. Shell structure 500 has an interfacial linker region 506, a core-shielding layer 508, and an outer polymer shell 510. Interfacial linker region 506 is immediately adjacent to the surface of particle core 302 and is formed by multiple linkers 406 that are attached to the surface. Core-shielding layer 508 is formed by a plurality of ICS groups 408 corresponding to different polymer strands 304 bonded to particle core 302. Outer polymer shell 510 is formed by a plurality of polymer molecules 410 corresponding to different polymer strands 304 bonded to particle core 302.

For a representative outer polymer shell 510, a dielectric breakdown is believed to occur via an electron-avalanche mechanism. In this mechanism, free electrons that are accelerated by the external electric field collide with polymer molecules 410. If the electric field is sufficiently strong, then the free electrons acquire enough kinetic energy between the collisions to produce secondary electrons via ionization of polymer molecules 410. The secondary electrons are accelerated by the electric field to cause further ionization and eventually create an avalanche current that breaks down the electrical insulating properties of the polymer.

Experimental data indicate that, without core-shielding layer 508, particle cores 302 generally cause the dielectric strength of the corresponding composite dielectric material to be lower than that of the "pure" polymer corresponding to outer polymer shell 510. This reduction in the dielectric strength disadvantageously offsets at least some of the benefits, as far as the energy-storage density is concerned, of the increase in the effective dielectric constant caused by the introduction of particle cores 302 into the polymer. It is believed that particle cores 302 tend to reduce the dielectric strength of the composite dielectric material for at least one of the following two reasons.

The first reason is that particle cores 302 typically have relatively shallow surface energy levels that trap electrons in the corresponding relatively weakly bound states. When an energetic free electron collides with particle core 302, it can transfer enough energy to a trapped electron so as to release the latter from the shallow surface trap, thereby producing a secondary electron. Because this electron-release process generally requires less energy than the process of ionizing polymer molecule 410, particle cores 302 might disadvantageously facilitate the generation of secondary electrons.

The second reason is that the external electric field might cause, with thermal assistance, cathode-like ejection of electrons from the shallow surface traps of particle cores 302. Since each of the ejected electrons might initiate an avalanche of secondary electrons, the composite dielectric material might disadvantageously become more susceptible to an avalanche-induced electrical breakdown.

The chemical composition of ICS groups 408 is specifically tailored so that the resulting core-shielding layer 508 is able to inhibit at least one or possibly both of the above-described electrical-breakdown mechanisms. More specifically, in one embodiment, the chemical composition of ICS groups 408 causes core-shielding layer 508 to have spatial regions characterized by a relatively high (e.g., located relatively close to the vacuum level) lowest unoccupied molecular orbital (LUMO). These LUMO orbitals tend to protect particle core 302 from being bombarded by free electrons, e.g., by deflecting or scattering the free electrons, through repulsive Coulomb interactions, away from the particle core. A reduction in the number of free electrons that reach the surface of particle core 302 in composite dielectric material 300 can advantageously inhibit collision-induced ejection of electrons from the shallow surface traps of the particle cores. Since the dielectric breakdown is a statistical process, lower probability of triggering an avalanche process is believed to increase the observed dielectric strength of the material.

In another embodiment, ICS group 408 comprises an aromatic ring with one or more electronegative groups attached to it. As known in the art, an electronegative group is a chemical group that attracts or is attracted to electrons. One example of an electronegative group is a fluorine or other halogen. These groups help the aromatic ring or ring system to which they are attached to accept an electron and transform into a radical anion. By chemically trapping free electrons, the highly electronegative groups of core-shielding layer 508 can advantageously hinder the formation of electron avalanches in composite dielectric material 300.

Figure 6A:
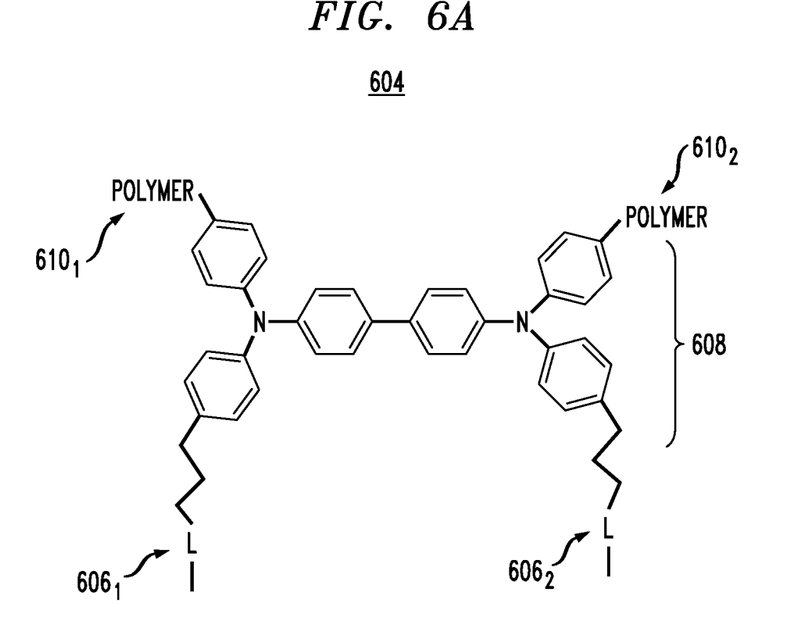
FIGS. 6A-J show chemical structures of exemplary interfacial core-shielding (ICS) groups, each of which can be used to implement the polymer strand of FIG. 4 according to various embodiments of the invention.
Figure 6B:
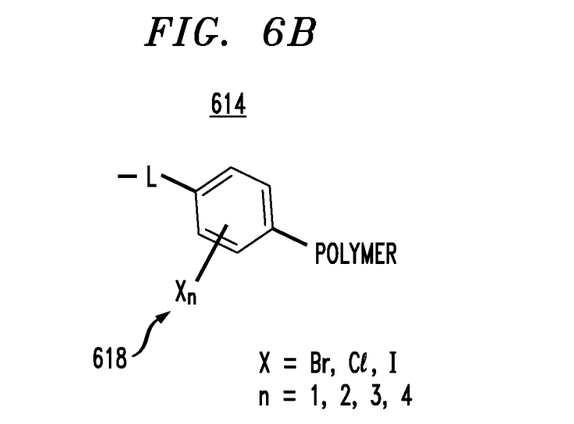
Figure 6C:
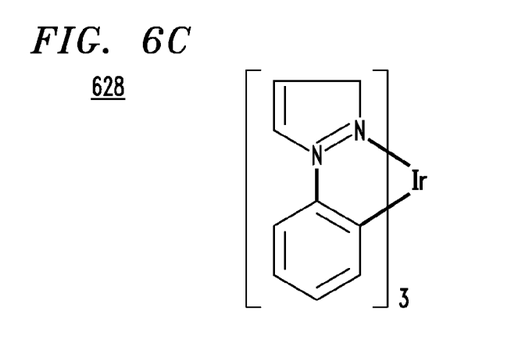
Figure 6D:
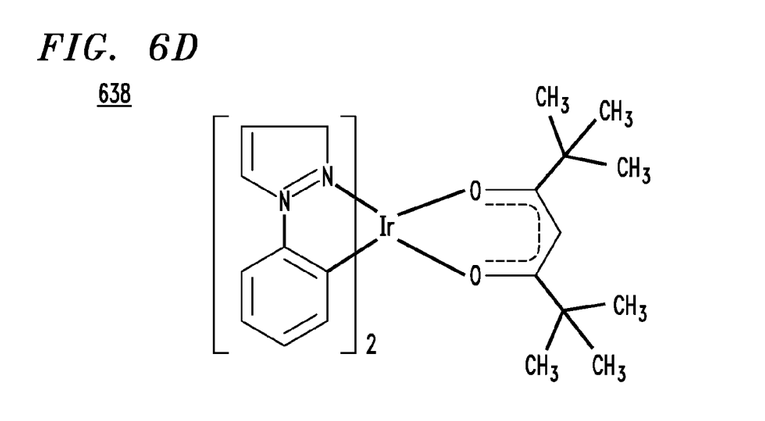
Figure 6E:
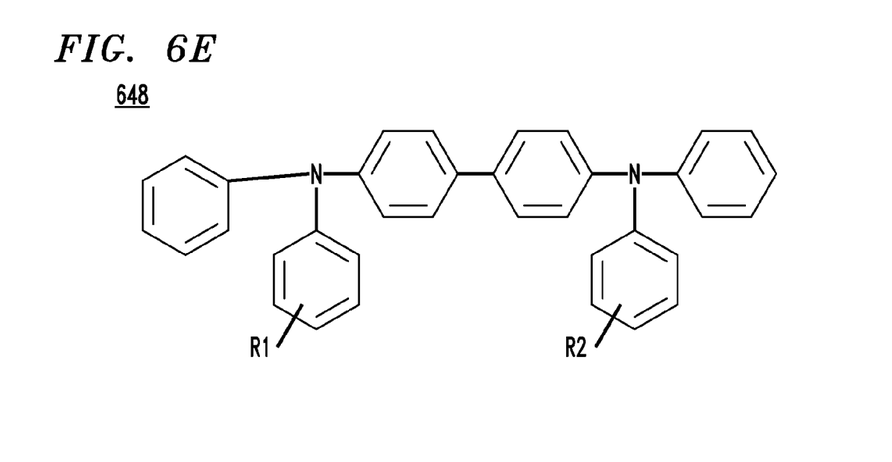
Figure 6F:
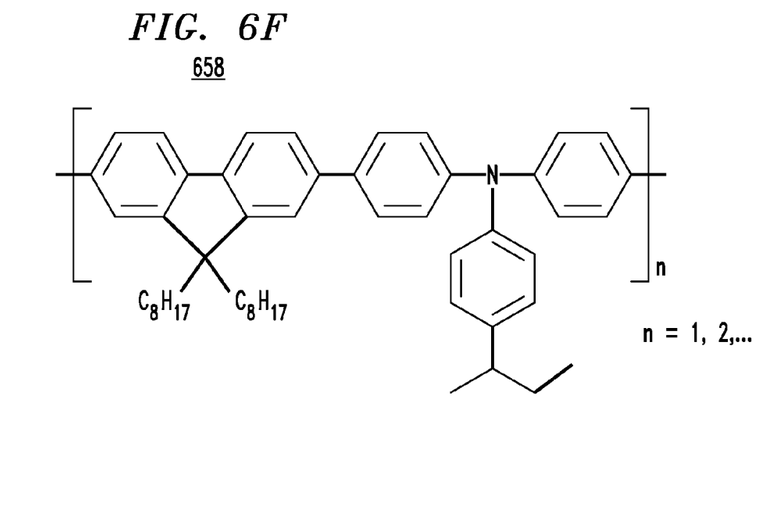
Figure 6G:
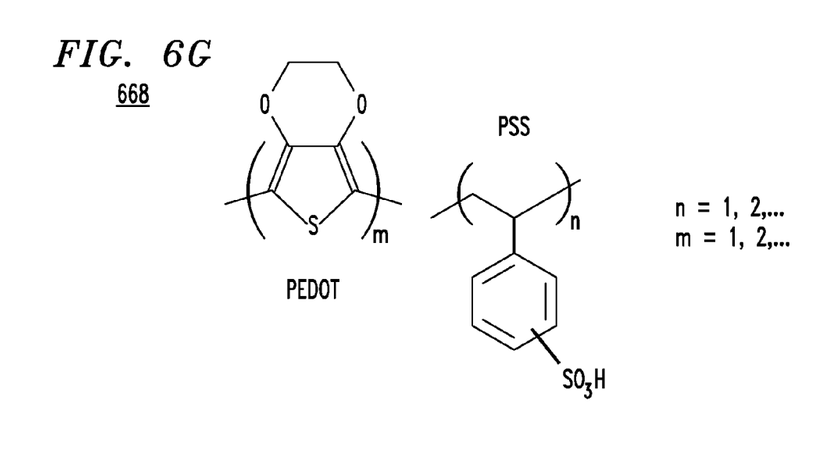
Figure 6H:
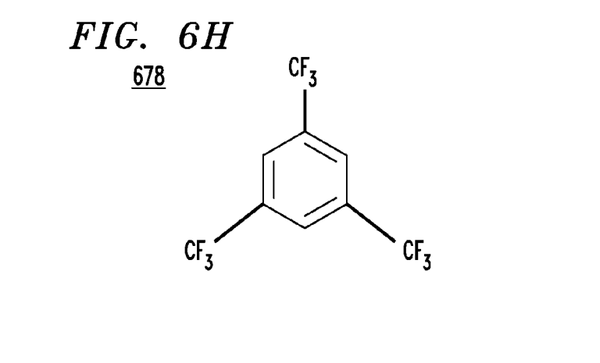
Figure 6I:
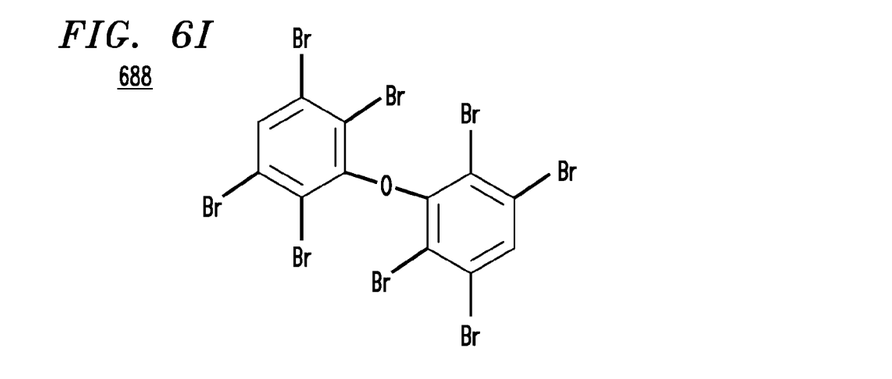
Figure 6J:
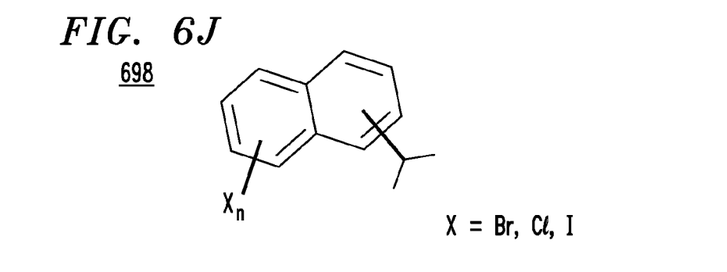

FIGS. 6A-J show chemical structures of several exemplary ICS groups, each of which can be used as ICS group 408 in polymer strand 304 according to various embodiments of the invention. For example, FIG. 6A shows a polymer strand 604 that has an ICS group 608 designed to cause core-shielding layer 508 to have spatial regions, which act as electron blockers or scatterers. Additional examples of electron-blocking/scattering moieties that can be used in polymer strand 304 are shown in FIGS. 6C-6G. FIG. 6B shows a polymer strand 614 that has an ICS group 618 capable of acting as an electron acceptor. Additional examples of electron-acceptor groups that can be used in polymer strand 304 are shown in FIGS. 6H-6J.

Referring to FIG. 6A, polymer strand 604 has two linkers 606$_1$ and 606$_2$ that can be the same or different. Polymer strand 604 also includes two polymer molecules 610$_1$ and 610$_2$ that can be the same or different. An ICS group 608 of polymer strand 604 comprises a derivative of 4,4'-bis[(p-alkylphenyl)phenylamino]biphenyl, commonly referred to as TPD. TPD has two linked triphenylamine groups, which causes ICS group 608 to have six aromatic rings in a non-planar arrangement. It is believed that this aromatic-ring arrangement causes polymer strands 604 to create spatial regions of relatively high electron density around the associated particle core 302.

Referring to FIG. 6B, an ICS group 618 of polymer strand 614 comprises a halogenated aromatic moiety. For example, for X=Br and n=1, the halogenated aromatic moiety is a derivative of bromobenzene. For X=Cl and n=3, the halogenated aromatic moiety is a derivative of trichlorobenzene. For X=I and n=4, the halogenated aromatic moiety is a derivative of tetraiodobenzene. It is known in the art that the halogenated aromatics, such as ICS group 618, have high electron affinities, which makes them very effective electron acceptors. Upon accepting an electron, ICS group 618 transforms into a relatively stable radical anion.

FIG. 6C shows the chemical structure of an ICS group 628 that can be used as ICS group 408 in polymer strand 304 according to another embodiment of the invention. ICS group 628 comprises (fac-tris(1-phenylpyrazolato,N,C2') Iridium (III), also often referred to as Ir(ppz)$_3$, where ppz stands for phenylpyrazole. Phenylpyrazole has two linked (non-fused) aromatic rings, i.e., a phenyl ring and a pyrazole ring. As known in the art, pyrazole is a heterocyclic aromatic compound having a 5-membered ring structure composed of three carbon atoms and two nitrogen atoms in adjacent positions. The chemistry of phenylpyrazoles is well developed in part because various phenylpyrazoles are widely used as insecticides.

FIG. 6D shows the chemical structure of an ICS group 638 that can be used as ICS group 408 in polymer strand 304 according to yet another embodiment of the invention. ICS group 628 comprises bis(1-phenylpyrazolato,N,C2')(2,2,6,6-tetramethyl-3,5-heptanedionato-O,O) Iridium(III), also often referred to as Ir(ppz)$_2$(dpm), where dpm stands for dipivaloylmethanate. The chemistry of metal-dipivaloylmethanates is well developed in part because various metal-dipivaloylmethanate complexes are widely used in metal-organic chemical-vapor-deposition (MOCVD) processes.

FIG. 6E shows the chemical structure of an ICS group 648 that can be used as ICS group 408 in polymer strand 304 according to yet another embodiment of the invention. ICS group 648 comprises a TPD derivative (also see FIG. 6A). Groups R1 and R2 can be the same or different and comprise a hydrocarbon.

FIG. 6F shows the chemical structure of an ICS group 658 that can be used as ICS group 408 in polymer strand 304 according to yet another embodiment of the invention. ICS group 658 comprises a copolymer of fluorene and triphenyl amine. As known in the art, fluorene, or 9H-fluorene, is a polycyclic aromatic hydrocarbon. In bulk, polyfluorenes are typically electrically conductive and electroluminescent. The chemistry of polyfluorenes is well developed in part because polyfluorenes are widely used as luminophores in organic light-emitting diodes (LEDs).

FIG. 6G shows the chemical structures of two ICS groups 668, each of which or both of which can be used to implement ICS group 408 in polymer strand 304 according to yet another embodiment of the invention. ICS group 668 comprises poly (3,4-ethylenedioxythiophene) or poly(styrenesulfonate). Poly(3,4-ethylenedioxythiophene) is essentially a sulfonated polystyrene and is often referred to as PEDOT. PEDOT is a conjugated polymer that carries positive charges. Poly(styrenesulfonate) is based on polythiophene and is often referred to as PSS. Part of the sulfonyl groups in PSS might be deprotonated and carry a negative charge. Together the charged macromolecules of PEDOT and PSS form a macromolecular salt. The chemistry of PEDOT:PSS mixtures is well developed in part because these mixtures are widely used as antistatic agents to prevent electrostatic discharges in various industrial processes.

In one embodiment, ICS groups 408 of polymer strands 304 have PEDOT, and material 300 has PSS as an additional (mixed-in, particle-core-unattached) component. In another embodiment, ICS groups 408 of polymer strands 304 have PSS, and material 300 has PEDOT as an additional (mixed-in, particle-core-unattached) component. In yet another embodiment, some polymer strands 304 have PEDOT as their ICS groups 408, and some other polymer strands 304 have PSS as their ICS groups 408.

FIG. 6H shows the chemical structure of an ICS group 678 that can be used as ICS group 408 in polymer strand 304 according to yet another embodiment of the invention. ICS group 678 comprises trifluoromethyl benzyl. The trifluoromethyl substitution is beneficial because it tends to stabilize radical anions.

FIG. 6I shows the chemical structure of an ICS group 688 that can be used as ICS group 408 in polymer strand 304 according to yet another embodiment of the invention. ICS group 688 comprises a brominated diphenyl ether. The chemistry of brominated diphenyl ethers is well developed in part because polybrominated diphenyl ethers (PBDEs) are widely used as flame retardants.

FIG. 6J shows the chemical structure of an ICS group 698 that can be used as ICS group 408 in polymer strand 304 according to yet another embodiment of the invention. ICS group 698 comprises a halogenated derivative of naphthalene.

Figure 7:
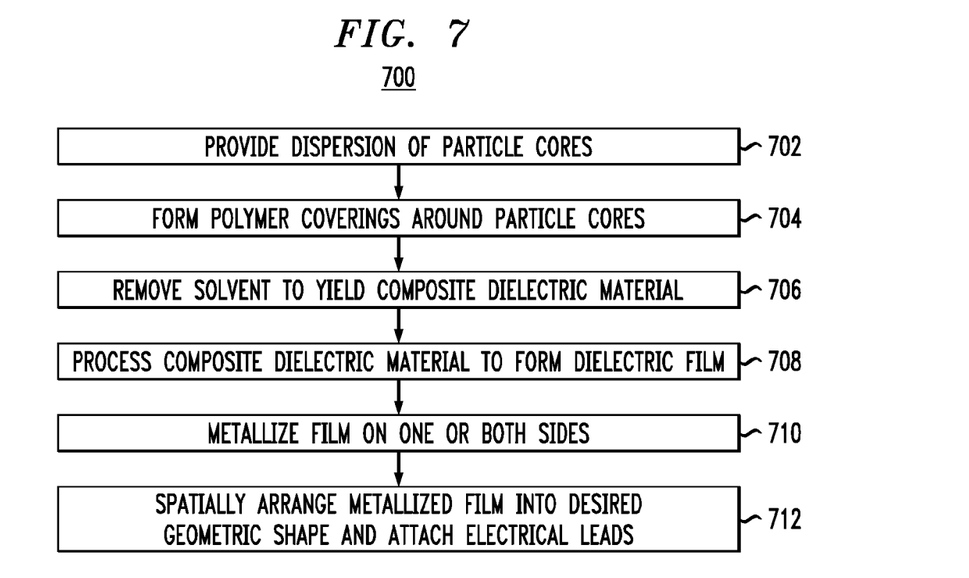
FIG. 7 shows a flowchart of a method of fabricating a capacitor that has the composite dielectric material of FIG. 3 according to one embodiment of the invention.

FIG. 7 shows a flowchart of a method 700 that can be used for fabricating a capacitor having composite dielectric material 300 according to one embodiment of the invention. For example, various embodiments of method 700 can be used to fabricate capacitors 100 and 200 (FIGS. 1 and 2). One skilled in the art will also appreciate that method 700 can be modified and adapted for fabricating other circuit components (e.g., field-effect transistors) that incorporate composite dielectric material 300.

At step 702 of method 700, a stabilized dispersion of particle cores 302 having desired sizes is provided in a suitable solvent. Particle cores 302 may be grown in the solvent in situ, and the resulting dispersion might contain a stabilizing agent that deters coagulation and aggregation of the particle cores.

At step 704, polymer coverings having polymer strands 304 are formed around particle cores 302. In one embodiment, step 704 includes (i) appropriately functionalizing polymer molecule 410 by attaching a chemical precursor of ICS group 408 and a chemical precursor of linker 406 to form a chemical precursor of polymer strand 304 and (ii) attaching the chemical precursor(s) of polymer strand 304 to the surface of particle core 302 to form the polymer covering. In another embodiment, step 704 includes (i) appropriately functionalizing a chemical precursor of ICS group 408 by attaching a chemical precursor of linker 406, (ii) attaching the functionalized chemical precursor of ICS group 408, via the chemical precursor of linker 406, to the surface of particle core 302, and (iii) attaching polymer molecule 410 to the attached chemical precursor of ICS group 408 to form the polymer covering. In yet another embodiment, step 704 includes (i) attaching a functionalized chemical precursor of ICS group 408, via a chemical precursor of linker 406, to the surface of particle core 302, wherein the attached functionalized chemical precursor of ICS group 408 serves as an initiator site for a polymerization reaction, and (ii) growing polymer molecules 410 at the initiator sites using a surface-initiated polymerization process to form the polymer covering.

Representative processing steps that can be used to implement step 704 are disclosed, e.g., in the above-cited U.S. Pat. Nos. 7,369,396 and 7,515,808 and U.S. Patent Application Publication Nos. 2005/0095448 and 2008/0017848. Other synthetic procedures that might be useful in implementing step 704 can be found, e.g., in the following publications: (1)

A. Maliakal, et al., "Inorganic Oxide Core, Polymer Shell Nanocomposite as a High K Gate Dielectric for Flexible Electronics Applications," *J. Am. Chem. Soc.,* 2005, v. 127, pp. 14655-14662; (2) M. A. White, et al., "'Click' Dielectrics: Use of 1,3-Dipolar Cycloadditions to Generate Diverse Core-Shell Nanoparticle Structures with Applications to Flexible Electronics," *Macromol. Rapid Commun.,* 2008, v. 29, pp. 1544-1548; (3) P. Kim, et al., "Phosphonic Acid-Modified Barium Titanate Polymer Nanocomposites with High Permittivity and Dielectric Strength," *Advanced Materials,* 2007, v. 19, pp. 1001-1005; (4) P. Kim, et al., "Solution-Processible High-Permittivity Nanocomposite Gate Insulators for Organic Field-Effect Transistors," *Applied Physics Letters,* 2008, v. 93, pp. (013302-1)-(013302-3); and (5) N. Guo, et al., "Nanoparticle, Size, Shape, and Interfacial Effects on Leakage Current Density, Permittivity, and Breakdown Strength of Metal Oxide-Polyolefin Nanocomposites: Experiment and Theory," *J. Am. Chem. Soc.,* 2007, v. 129, pp. 766-767, all of which are incorporated herein by reference in their entirety.

At step 706, the solvent (and optionally unwanted solutes) are removed to yield composite dielectric material 300. In one embodiment, the solution containing suspended particle cores 302 with attached polymer strands 304 is subjected to (e.g., vacuum) evaporation, which removes the solvent and possibly other volatile components and precipitates composite dielectric material 300. In another embodiment, the solution is subjected to centrifugation, after which the solvent is decanted with the supernatant, whereas composite dielectric material 300 is collected from the remaining pellet.

At step 708, the composite dielectric material 300 produced at step 706 is processed to form a dielectric film. The processing of step 708 might include (i) spin-coating a substrate with composite dielectric material 300 and/or (ii) extruding the heated composite dielectric material into a gas stream.

At step 710, the dielectric film produced at step 708 is metallized on one or both sides. The metallization process might include (i) physical vapor deposition, (ii) chemical vapor deposition, (iii) reactive sputtering, and/or (iv) molecular beam epitaxy.

At step 712, the metallized dielectric film produced at step 710 is patterned and spatially arranged to form a desired geometric shape. The geometric shape is then packaged and outfitted with electrical leads to produce a capacitor or other circuit element.

Figure 8:
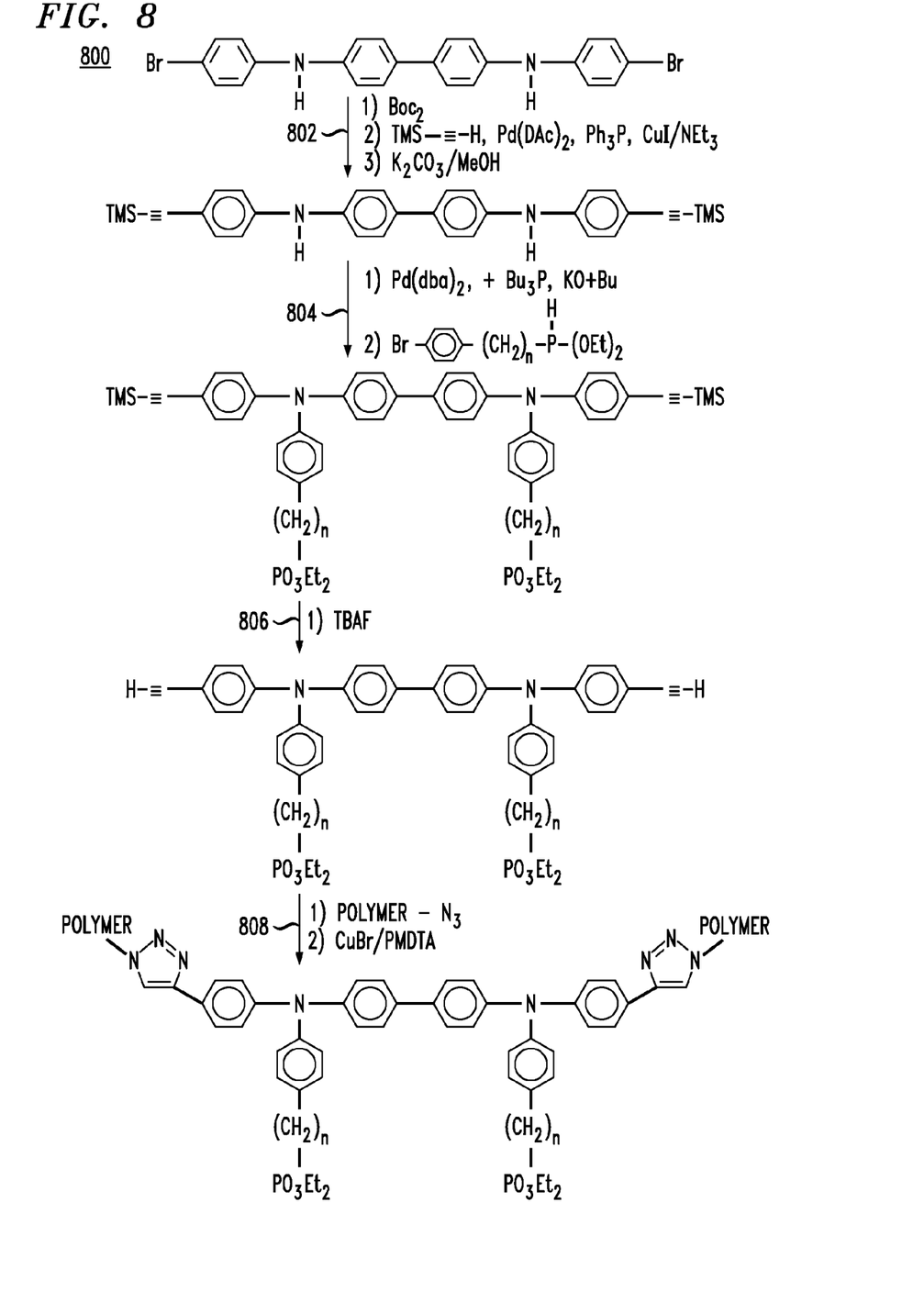
FIG. 8 schematically shows a chemical process that can be used at the step of forming polymer shells around particle cores in the method of FIG. 7 according to one embodiment of the invention.

FIG. 8 schematically shows a process 800 that can be used at step 704 of method 700 according to one embodiment of the invention. Process 800 can be used, e.g., to synthesize polymer strand 604 (FIG. 6A). One skilled in the art will appreciate that the methodology exemplified by process 800 can similarly be applied to the synthesis of various other embodiments of polymer strand 304 (FIG. 4).

Process 800 begins at step 802, where the commercially available compound, N4,N4'-bis(4-bromophenyl)-dibromo-[1,1'-Biphenyl]-4,4'-diamine, is used as the initial chemical substance. Nitrogen protection at step 802 is performed with di-tert-butyl dicarbonate (BOC anhydride).

At step 804, a Sonogashira-coupling reaction of trimethylsilyl (TMS) acetylene is performed to generate the bisacetylene functionalized derivative after the BOC protection is removed. Incorporation of the linker species (i.e. phosphonate) is performed by palladium catalyzed coupling of the bis-aryl amine with 2 equivalents of the phosphonate functionalized aryl bromide. The catalyst is bis(dibenzylidineacetone)-palladium(0), with tri-tert-butylphosphine ligand and potassium tert-butoxide).

At step 806, the TMS groups in the product of step 804 are deprotected using tetrabutyl ammonium fluoride (TBAF). After step 806, the bis-terminal alkyne group becomes available for click functionalization by various azide terminated polymers.

At step 808, click functionalization of the product of step 806 by an azide terminated polymer is performed with the assistance of a copper catalyst (i.e., CuBr/PMDETA ligand). Further pertinent details for the implementation of step 808 can be found, e.g., in the above-cited paper by M. A. White, et al., "'Click' Dielectrics: Use of 1,3-Dipolar Cycloadditions to Generate Diverse Core-Shell Nanoparticle Structures with Applications to Flexible Electronics," *Macromol. Rapid Commun.,* 2008, v. 29, pp. 1544-1548. The product of step 808 can then be attached to particle cores 302, e.g., as described in the above-cited U.S. Pat. Nos. 7,369,396 and 7,515,808 and U.S. Patent Application Publication Nos. 2005/0095448 and 2008/0017848.

While this invention has been described with reference to illustrative embodiments, this description is not intended to be construed in a limiting sense. Although various embodiments of the invention have been described in reference to capacitors, one skilled in the art can modify at least some of them in a relatively straightforward manner and apply to fabricating other circuit components, e.g., inductors, field-effect transistors, diodes, and switches. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims. Moreover, all statements herein reciting principles, aspects, and embodiments of the invention, as well as specific examples thereof, are intended to encompass equivalents thereof.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on. Similarly, while all figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

What is claimed is:

1. An apparatus, comprising:
a first electrode; and
a layer of a composite dielectric material adjacent to the first electrode, wherein:
the composite dielectric material comprises a first plurality of particle cores and a plurality of polymer strands;
a polymer strand of said plurality is chemically bonded to a corresponding particle core via a first linker and comprises an interfacial core-shielding (ICS) group and a first polymer molecule; and
the ICS group is chemically bonded to the first linker and to the first polymer molecule and comprises an aromatic moiety, wherein the aromatic moiety comprises a functional group selected from a set consisting of a metal complex of phenylpyrazole, a metal complex of dipivaloylmethanate, a derivative of chemically linked fluorene and triphenylamine, a derivative of poly(3,4-ethylenedioxythiophene), a derivative of poly(styrenesulfonate), a derivative of halogenated diphenyl ether, and a derivative of halogenated naphthalene.

2. The apparatus of claim 1, wherein inclusion of the ICS group increases dielectric strength of the composite dielectric material.

3. The apparatus of claim 1, wherein:
the composite dielectric material further comprises a second plurality of particle cores;
the particle cores of the first plurality comprise a first dielectric material having a first dielectric constant; and
the particle cores of the second plurality comprise a second dielectric material having a second dielectric constant smaller than the first dielectric constant.

4. The apparatus of claim 3, wherein inclusion of the second plurality of particle cores increases dielectric strength of the composite dielectric material.

5. The apparatus of claim 1, wherein the aromatic moiety comprises at least two aromatic rings in a non-planar spatial arrangement with respect to each other.

6. The apparatus of claim 1, wherein the ICS group comprises an electron acceptor that, upon accepting an electron, transforms into a stable radical anion.

7. The apparatus of claim 1, wherein:
the polymer strand is additionally chemically bonded to the corresponding particle core via a second linker; and
the ICS group is chemically bonded to the second linker.

8. The apparatus of claim 7, wherein:
the polymer strand further comprises a second polymer molecule; and
the ICS group is chemically bonded to the second polymer molecule.

9. The apparatus of claim 1, wherein:
the polymer strand further comprises a second polymer molecule; and
the ICS group is chemically bonded to the second polymer molecule.

10. The apparatus of claim 1, wherein the first linker is a phosphonate group, a silyl group, or a carboxylic group.

11. The apparatus of claim 1, wherein:
the particle cores comprise at least one of a metal niobate, a metal oxide, a metal titanate, a metal tantalite, a metal sulfide, a metal selenide, and a metal telluride;
the first electrode comprises a metal layer; and
the polymer molecule is a molecule selected from a set consisting of a polystyrene molecule, a polyethylene molecule, and a polypropylene molecule.

12. The apparatus of claim 1, wherein the particle cores have linear dimensions that are smaller than about 0.5 micron and occupy at least about 10% of volume in the composite dielectric material.

13. The apparatus of claim 1, further comprising a second electrode, wherein the layer of the composite dielectric material is located between the first and second electrodes.

14. The apparatus of claim 1, wherein the first electrode and the layer of the composite dielectric material are parts of a capacitor or a field-effect transistor.

15. The apparatus of claim 1, wherein the aromatic moiety comprises the metal complex of phenylpyrazole.

16. The apparatus of claim 15, wherein the metal complex comprises Iridium.

17. The apparatus of claim 1, wherein the aromatic moiety comprises the metal complex of dipivaloylmethanate.

18. The apparatus of claim 17, wherein the metal complex comprises Iridium.

19. The apparatus of claim 1, wherein the aromatic moiety comprises the derivative of chemically linked fluorene and triphenylamine.

20. The apparatus of claim 1, wherein the aromatic moiety comprises the derivative of poly(3,4-ethylenedioxythiophene).

21. The apparatus of claim 1, wherein the aromatic moiety comprises the derivative of poly(styrenesulfonate).

22. The apparatus of claim 1, wherein the aromatic moiety comprises the derivative of halogenated diphenyl ether.

23. The apparatus of claim 1, wherein the aromatic moiety comprises the derivative of halogenated naphthalene.

24. The apparatus of claim 1, wherein the ICS group is adapted to perform one or more of the following:
deflect or scatter electrons away from the corresponding particle core;
inhibit collision-induced ejection of electrons from surface traps of the corresponding particle core; and
accept an electron to transform into a stable radical anion.

25. The apparatus of claim 1, wherein, in the derivative of chemically linked fluorene and triphenylamine, a $C_6$ aromatic ring of the fluorene has a C—C bond to a $C_6$ aromatic ring of the triphenylamine.

26. A composite dielectric material, comprising:
- a first plurality of particle cores; and
- a plurality of polymer strands, wherein:
    - a polymer strand of said plurality is chemically bonded to a corresponding particle core via a first linker and comprises an interfacial core-shielding (ICS) group and a first polymer molecule; and
    - the ICS group is chemically bonded to the first linker and to the first polymer molecule and comprises an aromatic moiety, wherein the aromatic moiety comprises a functional group selected from a set consisting of a metal complex of phenylpyrazole, a metal complex of dipivaloylmethanate, a derivative of chemically linked fluorene and triphenylamine, a derivative of poly(3,4-ethylenedioxythiophene), a derivative of poly(styrenesulfonate), a derivative of halogenated diphenyl ether, and a derivative of halogenated naphthalene.

* * * * *